United States Patent
Franklin et al.

(10) Patent No.: US 7,571,089 B2
(45) Date of Patent: Aug. 4, 2009

(54) METHOD FOR SIMULATING A SYSTEM HAVING MULTIPLE FAILURE MODES

(75) Inventors: Kent A. Franklin, Neenah, WI (US); William J. Raynor, Jr., Appleton, WI (US)

(73) Assignee: Kimberly Clark Worldwide, Inc., Neenah, WI (US)

( * ) Notice: Subject to any disclaimer, the term of this patent is extended or adjusted under 35 U.S.C. 154(b) by 341 days.

(21) Appl. No.: 11/509,171

(22) Filed: Aug. 23, 2006

(65) Prior Publication Data
US 2008/0126040 A1    May 29, 2008

(51) Int. Cl.
G06F 17/50 (2006.01)
G06F 17/10 (2006.01)
G05B 13/02 (2006.01)

(52) U.S. Cl. .................. 703/17; 703/2; 703/7; 703/13; 700/30; 700/31; 700/51

(58) Field of Classification Search .................. 703/2, 703/7, 13, 16, 17, 21; 700/28–32, 51
See application file for complete search history.

(56) References Cited

U.S. PATENT DOCUMENTS 6,901,308 B1    5/2005   Hamada et al.

FOREIGN PATENT DOCUMENTS

| WO | WO 01/84254 A2 | 11/2001 |
|----|----------------|---------|
| WO | WO 01/84315 A2 | 11/2001 |
| WO | WO 01/84468 A1 | 11/2001 |
| WO | WO 2004/095340 A1 | 11/2004 |

OTHER PUBLICATIONS

"Making Everyday Life a Little Better," P&G PowerPoint presentation, 2004, 38 pages.

Ayala, F. Javier, "Reliability Knowledge—Improving, Sustaining, & Designing 'Highly' Efficient Production Systems," P&G PowerPoint presentation, ARC Forum, Jul. 2006, pp. 1-22.

Primary Examiner—Russell Frejd
(74) Attorney, Agent, or Firm—John L. Brodersen; Denise L. Stoker

(57) ABSTRACT

A method is described for determining the effectiveness of maintenance or other improvements to a system having multiple sections and multiple modes of failure. The method uses a simulation model that is dynamic in that it can change during a simulation run to show how a system event such as a failure of one system section can effect a different system section. By running the simulation model multiple times, it may become apparent which system section will benefit most from maintenance or other improvements.

18 Claims, 10 Drawing Sheets

METHOD FOR SIMULATING A SYSTEM HAVING MULTIPLE FAILURE MODES

FIELD OF THE INVENTION

The present invention relates to the field of methods for analyzing a system, and, more particularly, to simulating and analyzing repairable systems, such as manufacturing systems, for the purpose of identifying improvement opportunities, evaluating improvements, and determining the impact of new components or steps on the reliability of an entire machine or process.

BACKGROUND OF THE INVENTION

Reliability engineering encompasses the theoretical and practical tools by which the probability and capability of parts, components, equipment, products, and systems to perform their required functions can be specified, predicted, tested, demonstrated, installed, and initialized. Accurate reliability prediction can be used to identify and allocate resources for the implementation of changes, which can increase the reliability of a manufacturing system.

Reliability engineering tools which enable the accurate prediction of the reliability of parts, components, and systems can provide a company with a significant competitive advantage. For example, accurate prediction of the reliability of a proposed or existing manufacturing or production line can decrease costs, increase speed to market of new products, and provide more predictable project outcomes. Thus, manufacturing costs and capacity can be better understood and controlled with more accurate prediction methods, resulting in less market upset particularly during the early phases of a new product introduction.

Historically, reliability analyses and simulations have depended on methods, which determine the reliability of a machine section independent of the other machine sections. However, these analyses do not necessarily indicate with specificity the areas of a system to focus on with respect to maintenance, or to create a business impact. For example, one section of a system may experience about the same amount of failures as another section of the same system. However, the result of optimizing the one section over the other section may be indeed very different. This is because one subsystem may have an effect on the performance of another subsystem, even if indirectly connected. In addition, different events such as splices can occur which affect the number of times a machine section or system experiences down time. Current simulation software does not take into account how the inefficiencies of one section of the system can affect another section of the system.

As such, there is a need for simulation methods which can more accurately predict the reliability of the system based on interactions between machine sections and events such as splices. Further, there is a need to develop a dynamic model that can take into account the effect that system events have on all sections of a system, not just the section where the system event occurred. In addition, there is a need for simulation methods, which indicate what sections of the system will provide the most benefit in return for optimization or maintenance efforts.

SUMMARY OF THE INVENTION

The present invention is a method for simulating a system comprised of sections and having multiple failure modes, the method comprising the following steps: obtaining system event data for each of the section, statistically modeling the lifetime of each of the sections as a function of system events, simulating the system based on a dynamic simulation model, and implementing changes to the dynamic simulation model in real-time during the step of simulating the system.

In another aspect of the invention, provided is a method for simulating a discrete product manufacturing system comprising sections and having multiple failure modes, the method comprising the following steps: defining the system, identifying system sections that can cause system events, identifying system events that can affect the reliability of the system, statistically modeling the lifetime of the system, simulating the system based on a dynamic simulation model, recalculating the lifetime of at least one of the sections between at least one type of system event, and implementing changes to the dynamic simulation model during the step of simulating the system.

In yet another aspect of the invention, provided is a method for simulating a system having multiple failure modes comprised of sections and sub-sections, the method comprising the following steps: defining the system, identifying system sections that can cause system events, identifying system events that can affect the reliability of the system, statistically modeling the lifetime of the system, building a dynamic simulation model capable of taking into account interactions between sections as system events occur during a simulation run; and conducting multiple simulation runs by either changing the reliability of at least one system section, or by changing the impact of a system event on at least one machine section during each simulation run.

BRIEF DESCRIPTION OF THE DRAWINGS

While the specification concludes with claims particularly pointing out and distinctly claiming the invention, it is believed that the present invention will be better understood from the following description taken in conjunction with the accompanying drawings in which:

DETAILED DESCRIPTION OF THE PREFERRED EMBODIMENTS

Figure 1:
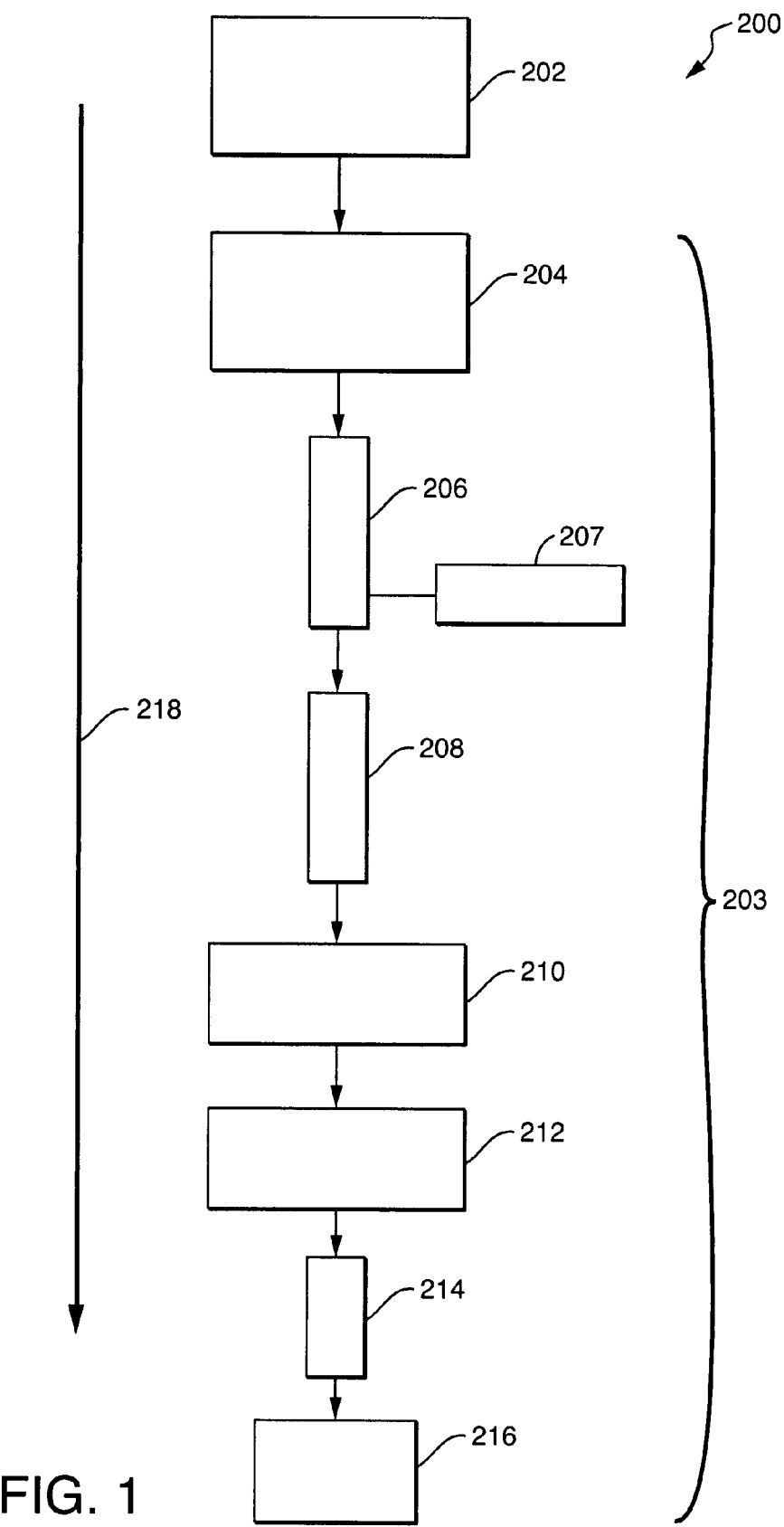
FIG. 1 is a schematic illustration of an exemplary system on which the method of the present invention may be used.

Reference will now be made in detail to the present embodiments of the invention, examples of which are illustrated in the accompanying drawings wherein like numerals indicate the same elements throughout the views. For purposes of clarity and simplicity, the following terms are used herein.

The term "system" is intended to refer to any set of components, methods, operations, or functions that deliver a product or service. Type of systems may include continuous-time ("continuous) or discrete-time ("discrete"); time varying, linear and nonlinear; multi-rate; hybrid, SIMO (single component in, multiple components out), MIMO (multiple components in, multiple components out), and MISO (multiple components in, single component out). Exemplary systems include manufacturing and production systems, airline flight operations, maintenance operations, queuing operations (e.g., traffic control, reduction of waiting time in lines or queues such as bank teller windows, gas pump, grocery check out, etc.), industrial deployment (e.g., rental car and truck fleet sizing, warehouse and transportation logistics).

The present invention is applied to an exemplary manufacturing system. The machine method or system composed of one or more machine sections or method steps such that the failure of one machine section or method step does not cause the system to immediately fail. However, the machine sections/method are comprised of sub sections/method, and the failure of any one subsection or sub will cause the entire machine section or method to fail.

The term "system event" is intended to refer to any event which negatively or positively affects the performance or function of a system or one of its components (e.g., scheduled maintenance, splices, system stops or component downtime), wherein each system event has a cause and may have a failure mode associated therewith. "System event" can also refer to a change in the system output, for example, a change in quality of discrete products produced by a system.

The term "uptime" is intended to refer to the period of time a system, or component thereof, during which it is operating or performing its intended function.

The term "downtime" is intended to refer to the period of time a system, or component thereof, during which it is not operating performing its intended function due to a system event.

The term "delay" is the total downtime a system or section experiences due to system events.

The term "failure mode" is intended to refer to a description of how a system can fail to perform its intended function. Each failure mode can have associated therewith one or more causes (or events which impact the failure mode); a downtime during which the failure mode has caused a system, or component thereof, to cease to perform its intended function; and an uptime until the next occurrence of a failure mode, during which time a system, or component thereof, is performing its intended function.

The term "parameterize" is intended to refer to the method of characterizing or fitting data according to a parametric equation (e.g., regression equations containing parameters of shape, scale, and location to describe data, such as Cox Proportional Hazards Model, Weibull equations, log-normal equations, normal equations, etc.). Desirably, the Cox Proportional Hazards Model is used, hereinafter referred to as the "Cox Model."

The term "cuts" is intended to refer to measures of production regardless of whether production is measured in weight, length or time. In a specific example such as a MIMO or SIMO manufacturing system, the number of cuts correlates directly to the number of products produced. For a MISO manufacturing system, cuts may refer to a measure of production such as amount of material produced in a given measure such as time.

The term "real time" is intended to refer to the state of the system during operation either by simulation or actual operation. For example, an improvement or change made to a system while the system is operating is made in real time. An improvement or change made to a system undergoing a simulation run while the system is operating is performed in real time.

Figure 2:
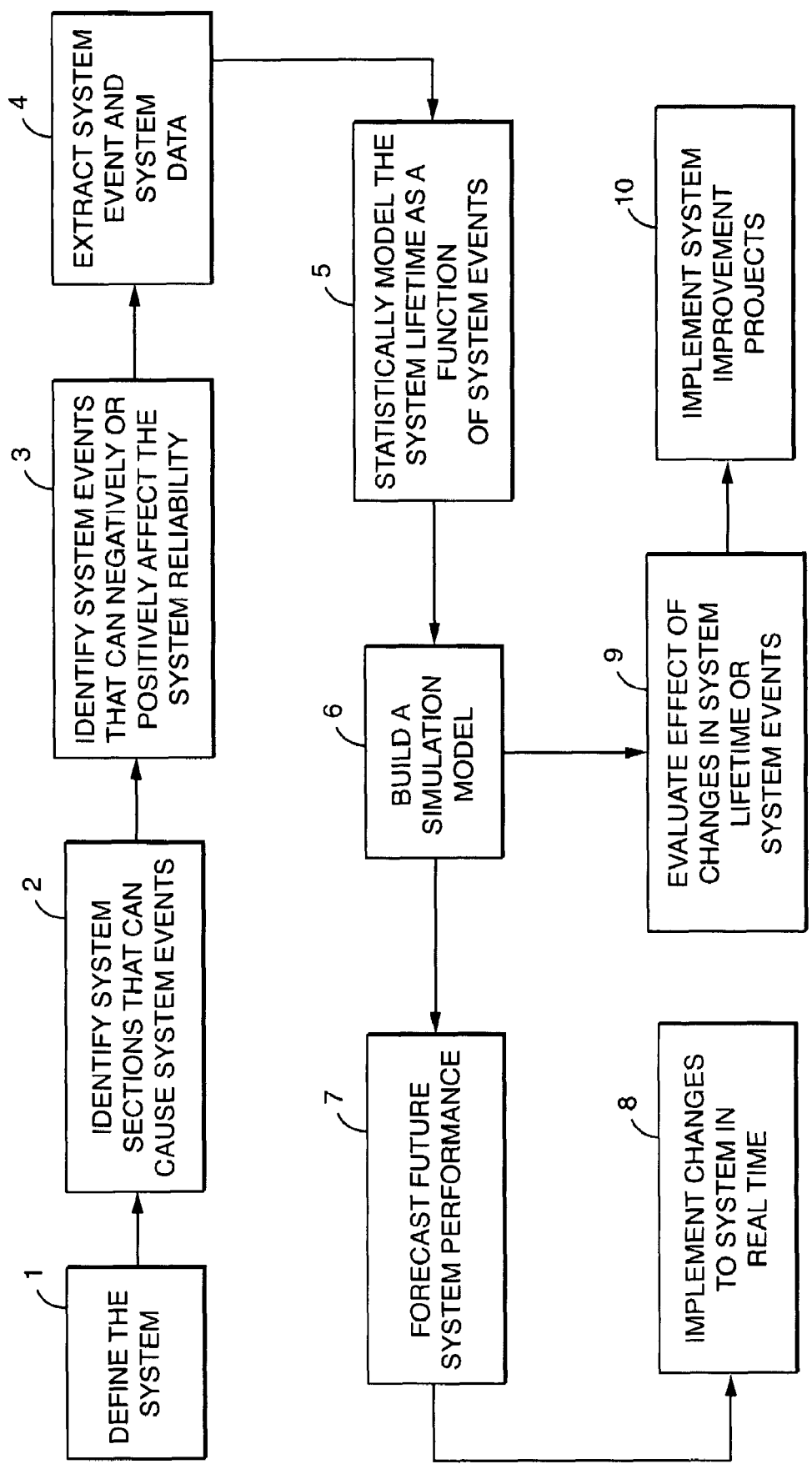
FIG. 2 is a schematic illustration of one embodiment of the method of the present invention.

In accordance with one embodiment of the present invention, a method for simulating an exemplary system will now be described (FIG. 2). Generally, the method of the present invention may include the following steps (which are in no particular order): defining a system to be simulated (step 1), identifying system sections(s) that can cause failures (step 2); identifying events that can negatively or positively affect reliability of the system (step 3); obtain or estimate system event data for each section (step 4); statistically modeling the reliability of each section by determining a baseline function for each system section and determining factors regarding the impact of system events on the lifetime of each system section (step 5); programming a simulation model into a computer so that dynamic simulation of the system reliability can be determined (step 6); experimenting with the simulation model to determine the impact of reliability improvements or machine events (steps 7 or 8); and implementing desired changes to the system (steps 9 or 10). See FIG. 2. The simulation method of the present invention captures dependencies between equipment and material, as well as system events such as material updates (e.g. a splice), the general wear and tear of components, and interactions between machine sections and systems as a whole. Each of the method steps will be discussed herein in the context of an exemplary system.

The method of the present invention may begin by defining a system as a multitude of discrete components. The present invention will be described herein with respect to a system in the form of a manufacturing system, and the machines which form the manufacturing system. More particularly, the present invention will be described herein with respect to an absorbent article manufacturing system 200, schematically illustrated in FIG. 1.

The specific example of FIG. 1 relates to a discrete-time, MISO, manufacturing system that produces disposable absorbent products (not shown) such as diapers, training pants, menstrual pads, incontinence pads, garments, and the like. Disposable absorbent products are typically constructed from a variety of continuous sheet and ribbon materials (e.g. nonwovens, cellulosic fibers, hook fasteners, films, tapes, etc.) and absorbent particulates that are adhered together by adhesives or ultrasonic bonds. The sheet and ribbon materials may be delivered to the manufacturing site in roll form, the adhesives and particulates may be delivered in containers As known in the art, roll materials, e.g. sheets, ribbons, strands and the like, are necessarily spliced together in the manufacturing method once a system roll is nearly depleted. The act of splicing may be hereinafter referred to a "splice." (It is noted that reloading a liquid or particulate matter into the system can have the same effect on reliability as a splice.) Like the materials from which the absorbent products are made, each absorbent product, is at one point in the manufacturing method, integrally connected to another absorbent product. The products are eventually separated and inferior products culled prior to packaging. As defined above, the act of separating the integrally connected products is referred to as a "cut."

The absorbent product manufacturing system, referred to in FIG. 1 as system 200, is made up of several general sections: a main machine 202, a buffer 204, a first conveyor 206, a stack accumulator 207, a second conveyor 208, a bagger 210, a post bagger buffer 212, a third conveyor 214, and a case packer 216. Sections 204-216 are collectively referred to as packaging 203. Each section may include one or more sub-sections, for example, main machine 202 is modeled as a group of forty three (43) individual machine sub-sections (not shown).

The main machine 202 is the starting point for material flow in the exemplary system 200. Individual articles (e.g. disposable absorbent pants) are manufactured on the main machine 202 at a specified rate and grouped into a stack as is known in the art. As described previously, each "cut" creates an individual article. Once a grouping of articles is created, such as a stack of pants, the grouping or stack exits the main machine 202 and moves into a buffer 204 and subsequently through the rest of the system 200 so that it may be packaged, if desired.

While the manufacturing system 200 is described herein at a machine hierarchical level, it will be appreciated that the manufacturing system 200 can be described at higher and lower hierarchical levels based upon the analysis objective and desired level of simulation accuracy and that these various levels can be simulated collectively or individually as desired. For instance, a higher hierarchical level might include a distribution network comprising a plurality of manufacturing plants (a parallel system), each of which have a plurality of the manufacturing systems 200, wherein the manufacturing systems 200 have a plurality of machines (e.g., a pulp processor) associated therewith and each machine has a plurality of sub-components (e.g., a hammer mill for the pulp processor). Further, while the present invention is described herein with respect to a manufacturing system, it will be readily appreciated that other products, services, manufacturing systems, and the like are suitable for use with the present invention as previously described. In addition, the system need only be functionally connected, and may, if appropriate, be physically connected in series, parallel, or a combination thereof.

An external database 100 is shown in FIG. 1, but is not a necessary part of system 700. External database 100 may contain input or data regarding system 200, which is later used by a simulation model as described herein. Preferably, external database 100 is a computer that stands alone or is physically connected to system 200.

When enough cuts have been made on the main machine 202 to collect a grouping of articles, the grouping may be indexed away from the system 200 to an in-line buffer such as buffer 204. If conditions are such that the grouping, such as a stack, can enter buffer 204, the grouping moves away from the main machine 202 and a new stack begins to form.

If downstream conditions have caused the buffer 204 to fill with groupings of articles, and the current grouping can not enter the buffer 204, the status or state of the system 200 is set to be "blocked" and new cuts on the machine cannot be made until the current grouping moves away from the buffer 204. This is "registered" in the simulation program as a packaging machine stop.

Groupings of articles such as stacks may proceed from buffer 204 to a stack accumulator 207 via a conveyor 206. The stack accumulator can operate as an in-line buffer, or it can function to take groupings of articles off-line when downstream resources are experiencing a system event. The articles can then be reintroduced back into the system 200 after the downstream sections are no longer experiencing a system event. Diverting articles to the stack accumulator allows the main machine 202 to continue to run when downstream sections are experiencing a system event. However, if the buffer 204 fills to capacity, the main machine 202 becomes blocked and the machine stops.

The stack accumulator 207 is an optional section. The external database 100 may contain data to indicate whether or not the section will be used in the simulation. If the stack accumulator 207 is used, then a grouping or stack re-feed rate is input into the external database 100. Groupings of articles coming directly from the main machine 204 may take priority over groupings being re-fed back into the system 200 so as not to cause the main machine 202 to experience a system event due to re-feed from the stack accumulator 207.

Article groupings flow from conveyor 206 to conveyor 208 directly, or after re-entering the system from the stack accumulation conveyor 207. From conveyor 208, groupings proceed to a bagger 210.

At the bagger 210, a specified number of groupings are collected into a final group and bagged. The number of articles per bag is a user-defined variable, which may be changed in the simulation at the external database 100. Once a bag is filled with a final group of articles and sealed, the bag may proceed to a post bagger buffer 212.

Bags of articles proceed from the bagger 210 to the post bagger buffer 212. The buffer 212 may operate as an in-line buffer or it may operate as an exit point for bags when downstream sections have failed. If the buffer 212 acts as an exit point, similar to stack accumulator 207, bags are re-fed back into the system 200 at the same point at a later time.

The external database 100 may have input fields to indicate the capacity of the buffer 212 and a re-feed rate. The value that is entered for the re-feed rate determines how the buffer functions. Bags accumulate as necessary in the buffer 212, but are never pulled off-line. If the buffer 212 fills to capacity, the main machine 204 or other upstream sections may eventually become blocked.

Bags of articles proceed from the post bagger buffer 212 to a case packer 216 via a conveyor 214. The velocity of conveyor 214 may be input in the external database 100. Once bags of articles proceed to the case packer 216, a predetermined number of bags are grouped together to form a case. The number of bags per case is a user-defined variable, which can be input into external database 100. The case packer 216 is the last section of system 200.

Each section or sub-section that can cause a failure of the system is identified. In this example, at least the forty-three machine sub-sections are identified as being capable of causing a system 200 failure. In addition, packaging 203 sub-sections may be identified as a potential cause of a system failure. Each sub-section could be further sub-divided into components.

To apply the method of the present invention, all active sub-sections must be operating each time the main machine 202 makes a cut. If an active subsection experiences downtime, then the entire section experiences downtime. Further, all active subsections must be running for a corresponding section to run. Each section of system 200 and the data used to calculate the reliability of each section described is explained in further detail below.

At the beginning of a simulation run for main machine 202, each sub-section may have a predicted run-life or lifetime based on reliability data supplied to the model via the external database 100. As described herein, the predicted lifetime for a sub-section represents the number of cuts the sub-section will last until it fails.

Desirably, the simulation model described herein assumes that raw materials are always available for system 200. Despite this assumption, material consumption may be tracked in the simulation model. In this particular example, eighteen (18) different materials are consumed at the main machine 202. Such materials include but are not limited to the following: outer cover non-woven, liner nonwoven, fluff, superabsorbent particles, adhesives, and elastic strands.

External events are identified which could negatively or positively affect the reliability of each machine section of system 200. For example, when a new roll of material is spliced into the main machine 202, the reliability of the system 200 may be negatively impacted. Therefore, splice occurrences for every material used on the main machine 202 may be identified as system event. Other actions that may affect system 200 reliability include the introduction of a material into the system 200, such as an adhesive or superabsorbent material. Other system events include downtime for preventative maintenance and machine stops.

System conditions or factors can also impact the reliability of the system. For example, the speed of system 200 may be identified as a condition that can affect the reliability of the system. The following other influential factors include: splice occurrences, length of prior down time, speed of system 200 or machine section 202, length of prior uptime, a machine section 202 that caused prior down time, and the number of days since the last prescheduled maintenance.

Data (or estimated data) is extracted from the system 200 in a form suitable for data analysis. Useful data may include: identification of the particular machine sub-sections which caused a machine stop, the number and location of material splices, the number of cuts from a prior system event, the number of cuts since the last system event for a particular machine section 202, and the number of cuts since the last material splice for each. In general, the data collected includes at least the length of uptime before each system 200 failure, and can be used to relate the system 200 events and conditions to the system 200 failure. Method settings, material properties, equipment changes, machine crews, and maintenance events may be included.

Data regarding system 200 may be statistically modeled using various statistical models as is known in the art. Statistical modeling of system 200 may be performed parametrically or semi-parametrically. Preferably, the Cox Proportional Hazards Model (the Cox Model) is used to predict the lifetime of each machine section. The Cox Model is a semi-parametric reliability model. Like the better-known Exponential, Weibull, and Log-Normal reliability models, the Cox Model allows one to include influential factors such as splices, run-speed, and start-up problems into the statistical model. However the Cox Model is more general because it allows a general shape to a basic risk curve and allows model covariates to have a time-varying effect.

The Cox model allows influential factors to change the lifetime of machine sections such as main machine 202. The model does this by making a "hazard function" for different combinations of external risk factors that is proportional to a "no external events" case. In the context of the present example, the hazard function is defined as the probability that a machine section will fail in the next cut in light of the fact that the machine section was running just prior to the cut. A proportional hazard in this context means that events that can change the hazard function, will do so proportionally. For example, a splice introduced into main machine 202 may double or triple the current hazard function until it passes through a particular sub-section of main machine 202. External risk factors are also considered system events or conditions, and are referred to as "covariates" in the following discussion.

A Cox Model with time varying covariates may be fit by processing the system 200 data extracted in stepwise fashion into a series of intervals where the system section state is approximately constant. The age of a system section at the start of an interval is the number of cuts since the last restart of the section, and the age at the end of an interval is the starting age plus the number of cuts in the interval. The Cox Model analysis yields a baseline survival function, defined as a function that can be used to determine the average risk of failure over time, a vector describing the average state, and a second vector of coefficients specifying the effects of describing from the average state on a hazard score, which is computed as a coefficient-weighted sum of deviations from the mean state For the example of the present invention, values for cumulative hazards given cuts may be determined using the following relationship:

$$H_{t_i+j} = Hi = H_{t_i} + j \cdot h'_{i+1}$$

Where $t_i+j$ is a cut in the interval $(t_i, t_{i+1})$. $H_i$ is a the cumulative hazard at $t_i+j$, and $H_{t_i+j}$ is the average incremental hazard between cuts i+j.

Values for cuts given a cumulative hazard are determined using the following relationship.

$$t_i + j = t_i + \frac{H_{t_i+j} - H_{t_i}}{h'_{i+1}}$$

In the present example, system 200 data, such as main machine 202 data, was fit using the Cox Model to output (1) a baseline survival function for each system 200 section (See, S Matrix, Table 2) and (2) section-specific coefficients that scale the baseline survival function based on the impact of the covariates. Delay times for each main machine 202 sub-section were fit to an exponential distribution. In the alternative, a simpler Cox Model (Kaplan Meier curve) or other reliability distribution could have been used for the delay time distribution.

The "M" matrix contains section-specific coefficients that scale the baseline survival function, and thereby defines a baseline state of each section. Changes from the baseline state represented by these values change the remaining reliability of the section from the current baseline state. The section-specific coefficients may themselves be functions of a number of cuts. Specifically, the M matrix contains vectors of length p containing section-specific coefficients m1, m2, . . . , mp, which are mean values relating to the covariates of vector X as shown in Table 1.

TABLE 1

Sample M Matrix*

| Machine Section Name | M1 . . . | M 13 . . . | Machine Speed | Length of Prior Run . . . |
|---|---|---|---|---|
| Wrapsheet | .0902343 | .1254543 | .338345 | .834534 |
| Waist Elastic | .0923543 | .1259568 | .337999 | .843545 |
| Superabsorbent Material | .0984215 | .1258633 | .338234 | .823112 |
| Adhesives | .0923564 | .1259996 | .338298 | .823433 |
| Outer Cover | .0934626 | .1258968 | .338124 | .823423 |

*Raw Data

The "B" matrix also contains system section-specific coefficients that scale the baseline survival function. Specifically, the B matrix (not shown) contains vectors of length p for each section containing system section-specific coefficients (b1, b2, . . . , bp) relating to the covariates of vector X as shown in Table 1.

The "S" matrix is used to determine the probability of a section surviving past the next number of "cut" in a series of cuts when the system section in the baseline state is specified in the M matrix. The S matrix as shown in Table 2 contains the baseline survival functions for each section of the system. The rows that make up the S matrix may have the following elements:

TABLE 2

Sample S Matrix

| Machine Section | $t_i$ | $H_{ti}$ | $h'_i$ |
|---|---|---|---|
| 1 | 0 | 0 | |
| 1 | 1 | .002417 | 0.00241654 |
| 1 | 2 | .002666 | 0.00024998 |
| 1 | 3 | .002918 | 0.00025101 |

$t_i$ = The cuts at the end of the section (NOTE: changed 'i' to a subscript)

$H_i$ = The cumulative hazard at the end of the section (NOTE: changed 'i' to a subscript)

$$H_i = \sum_{i=1}^{t_i} h_i$$

$h'_i$ = hAVG = The constant hazard for this section (NOTE: changed 'i' to a subscript)

$$h'_i = \left(\frac{H_{i+1} - H_i}{t_{i+1} - t_i}\right)$$

One skilled in the art will realize that the B, S, and M matrices are only one way to store this type of data, and the invention is not intended to be limiting in this respect. In addition, the sample matrices shown in Tables 1 and 2 are incomplete and the data therein exemplary.

The statistical model is used to build a simulation model. In the present example, the simulation model was programmed in a commercially available program such as ARENA®, which is a discrete event simulator developed by Rockwell Automation. Of course, other commercially available or non-commercially available programs may be used to run the simulation model.

The simulation model is a computer program. Like most computer programs, it contains blocks of computer program code or sub-programs. The sub-program may be grouped together into sub-modules. For instance, the system 200 of FIG. 1 may have ten sub-modules.

The sub-modules of the example system 200 may include section-specific coefficients and variables relating to the following: material splices, waste factors, machine section control, machine stops, seeds for random data, the main machine, the bagger, the case packer, packaging component failures, material properties, method settings, and the like. One sub-module may also read data from the external database 100. Each sub-module can track different section-specific coefficients and variables of the system 200.

Each sub-module falls into one of three main categories: general system logic, material flow logic, and control logic. For example, the General System Logic can read external data into the sub-module from an external database 100 such as a spreadsheet file and provides seeds for random number streams. Material Flow logic may include the main sections which make up a manufacturing system, which in the example of FIG. 1 is the main machine 202, the bagger 210, and the case packer 216. Control Logic consists of the program code for monitoring the system 200 and creating events that affect the system 200. Control Logic includes managing material splices, the waste factor on the main machine, machine section failures and packaging component failures.

Sub-modules that may be used in the simulation model of system 200 are briefly defined:

Seeds for Random Streams Sub-Module:
The sub-module "Seeds for Random Streams" contains program code to generate random numbers, and is referred to as a "seeds element." The seeds element is used to define a unique random number streams for each location in the simulation model where a random number from a distribution is drawn. The seeds element allows the user to initialize the initial seed value and the reinitialize option, for each random stream.

Main Machine Sub-Module:
The "Main Machine" sub-module includes computer program code used to simulate the following functions:
Make cuts on the main machine 202
Group articles
Method groupings through the post stacker buffer 212
Recognize downstream failures and stop the main machine 202 as necessary
Restart the system 202 after a system event Bagger Sub-Module:
The "Bagger" sub-module includes program code to:
Group a specified number of article groupings into a bag
Delay each bag for the bagger cycle
Block the bagger when downstream equipment or handling equipment experiences a system event Case Packer Sub-Module:
The "Case Packer" sub-module has computer program code to:
Group a specified number of bags into a case
Delay each case for the case packer cycle
Count and remove completed cases from the system 200

Machine Section Control Sub-Module:
The sub-module "Machine Section Control" contains computer program code to:
Create a control entity for each system section
Calculate the initial run life for a machine 200 section
Re-calculate the uptime or lifetime for a section after a material spice
Re-calculate the uptime or lifetime for a section after a failure
Re-calculate the uptime or lifetime for a section when a packaging component fails downstream of the main machine 202

A control entity for each sub-section or section of main machine 202 is input into the model. Section control entities calculate the uptime or lifetime of a machine section based on data supplied from the external database 100 and current conditions in the model. Section control entities are also used to adjust the lifetime or uptime of each machine section as certain events occur in the model and as time advances. When a section control entity is first created, values for section attributes such as HDONE, HMAX, and SCORE are calculated. These attributes are used to calculate the initial value for MAXCUTS which represents the number of cuts the section will last prior to failure.

Once an initial lifetime for each system 200 section has been determined, each section is placed in a ranked queue based on the lifetime value. The section with the shortest lifetime goes to the head of the queue, and will be the next section to cause a system event. All forty-three section control-entities remain in the queue until a signal is sent to release them. Section control-entities are released in order to update their run life when a system event occurs.

Stop Machine Sub-Module:

The sub-module "Stop Machine" contains computer program code to:

Identify which sub-section will cause the next system event on the main machine 202

Track the cuts on the main machine 202 and cause a system event at the required time Recognize a material splice and signal each machine 202 sub-section to update lifetime Create a system event on the main machine 202 for a specified period of time Restore the main machine 202 to an operating state after a downtime or system event A "create" module is used to create a single entity which causes a system event at main machine 202. This entity determines how many new cuts to make based on sub-section lifetime calculations and schedules system events at the required cut.

When the main machine 202 makes a number of scheduled cuts, this single entity is used to fail the main machine 202 and keep it down for a specified period of time. After the duration of the system event, the main machine 202 is restored to an operating state and the control entity repeats the method. The control entity also sends a signal to the main machine 202 sub-sections when a splice occurs to update their lifetime.

This sub-module tracks the number of cuts into a segment and sets waste factor to the appropriate value based on the number of cuts into the segment.

Track Material Splices Sub-Module:

The "Track Material Splices" sub-module contains computer program code to:

Create a control entity for each material

Calculate the initial capacity for each material (e.g. roll capacity for each roll of sheet material)

Inform the main machine 202 when a splice occurs

Re-calculate capacity for a material after a splice has occurred

The program logic in this sub-module is used to create a control entity to represent the raw materials consumed by the main machine 202.

At the beginning of a run, the control entity for each material randomly generates a roll capacity from a triangular distribution or other user-specified distribution. The parameters for the distribution are supplied from the spreadsheet interface. As cuts are made on the main machine 202, material usage is tracked. When a roll has been consumed, the material control entity signals that a material splice will occur. This causes the main machine 202 sub-sections to regenerate a value for their lifetime.

When a material signals a splice, a variable for that material is set to a value to indicate that a splice has been made. In the present example, this variable maintains this value for a predetermined number of cuts after the splice, such as the first thousand cuts. Of course, one skilled in the art will realize that other values may be used. After predetermined number of cuts, the value of the variable is reset to zero or some other number to indicate that the material is beyond predetermined number of cuts. After a splice, the control entity calculates a new value for roll capacity and the method repeats.

Packaging Component Failures Sub-Module:

The "Packaging Component Failures" sub-module contains computer program code to:

Randomly fail and restore packaging resources

This sub-module has a separate loop for each of the four packaging sections, which are subject to random failure in the simulation model. The four packaging sections are the stack accumulator 207, the bagger 210, post bagger buffer 212 and the case packer 216.

Even though each system 200 section is controlled separately, the logic to generate a failure is similar for each. The control entity for each component follows the general procedure indicated below.

1. Generate uptime based on the parameters supplied from the external database 100.

2. Convert the uptime to number of cuts.

3. Track the number of cuts on the main machine 202 and at the required cut, cause a system event at the packaging component section.

4. Inform the main machine 202 that a packaging section has failed.

5. Generate a system event time (the amount of downtime for the section) based on the parameters supplied from the external database 100.

6. Maintain control of the section until the system event time has elapsed.

7. Restore the section to a ready state after the system event.

8. Repeat steps 1-7.

Initial input for the simulation model for system 200 may include the following. For each machine section such as main machine 202, there is a listing of each sub-section or component by name, a sub-section type (e.g. packaging or main machine 202); active status; ppm per lifetime; total survival S max; and some random numbers to define initial conditions. Other initial conditions for the main machine 202 include the following:

TABLE 4

Percentage of Life - Initial Conditions

| | | |
|---|---|---|
| SCORE | 0 | |
| HDONE = −ln(SDONE) | | −ln = negative natural log |
| HMAX = −ln(SMAX) | | |
| SDONE > SMAX | | |
| Inactive = 0 | | |
| active = 1 | | |
| Find PREVIOUS_CUTS using HDONE | | |
| Find MAXCUTS using HMAX | | |
| PM | 35 | > than or equal to 0 |
| Length of prior run | 11 | mean |
| Length of prior down | 4 | mean |

TABLE 4-continued

Percentage of Life - Initial Conditions

| | | |
|---|---|---|
| Last section to fail | 1 | 0 |
| Restart | 1 | 1 or 0 |
| Cuts | 0 | 0 |
| Avg machine speed | 567 | ppm |
| Stacker Capacity | 200 | Number of pants |
| Number of Pants Per Stack | 25 | |
| Pre-Bagger Stack Accumulation Capacity | 0 | Number of Stacks |
| Bagger Rate | 33 | Bags Per Minute |
| Number of Stacks Per Bag | 1 | |
| Number of Bags Per Case | 4 | |
| Caser Rate | 5.51 | Cases Per Minute |
| Pant Length | 9 | inches |
| Bag Length | 18 | inches |
| Conveyor 1 Velocity(stacker to stack accumulation conveyor) | 300 | inches per minute |
| Conveyor 2 Velocity(stack accumulation to bagger) | 600 | inches per minute |
| Conveyor 3 Velocity(bagger to casepacker) | 600 | inches per minute |
| Post Stacker Accumulation capacity | 100 | Number of Stacks |
| Stack Feed Rate | 5 | Stacks/min |
| Post Bagger Accumulation Capacity | 1000 | Number of Bags |
| Bag Feed Rate | 60 | Bags/min |
| Pre-Bagger Stack Accumulation Feed Rate | 10 | Stacks/min |

For splices, the initial input may include the main machine 202 subsection at which the splice enters the main machine 202; a material identification, name, and code; active/inactive status; and minimum, maximum, and average quantity of material. For packaging 203, the sub-section name, average run time, average delay time, active status, and average MP/hour from data pull may be included in the initial conditions.

Figure 3:
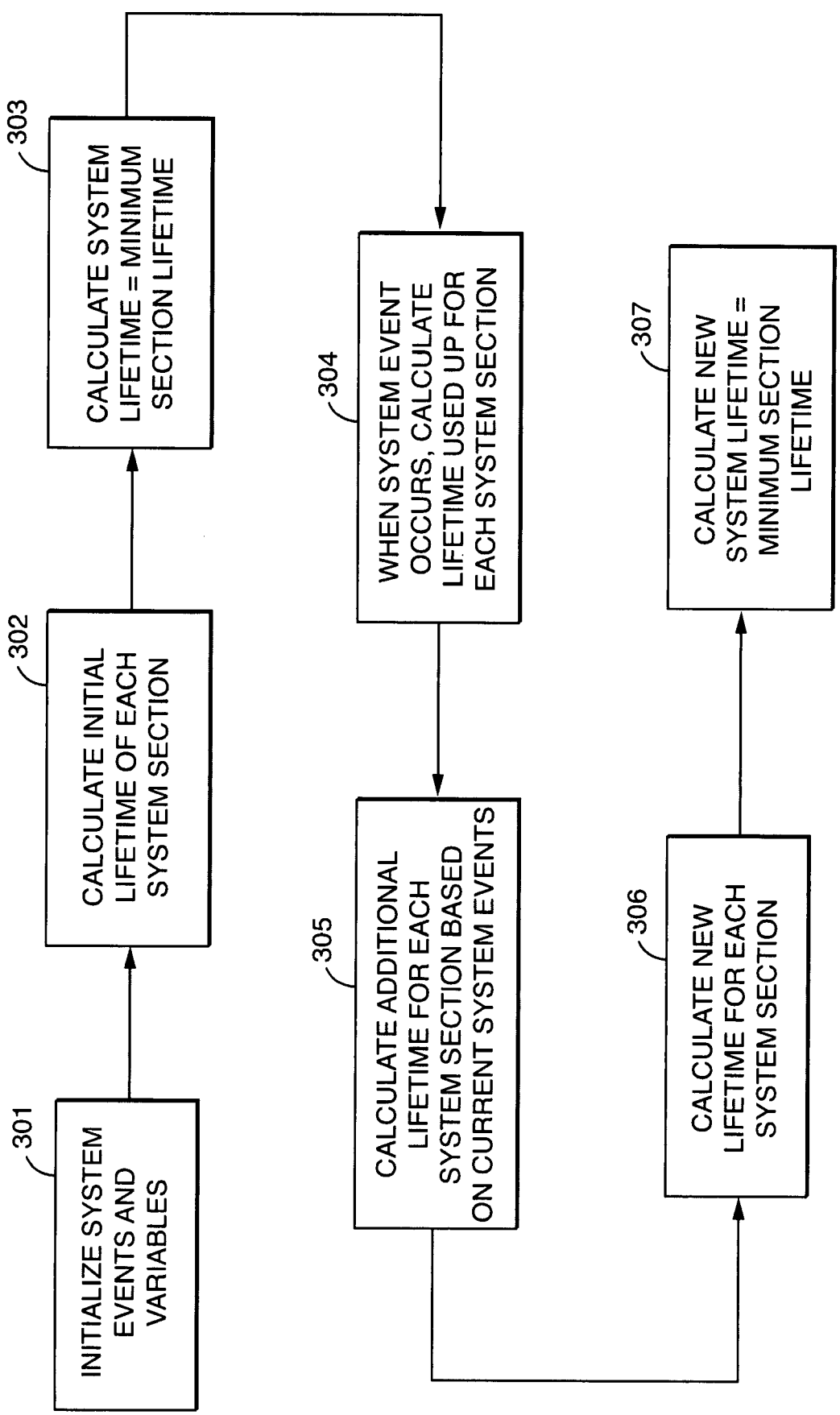
FIG. 3 is a schematic illustration of a sub-method for a method step shown in FIG. 2.

Referring now to FIG. 3, the building of a simulation model is done in several steps as follows (not necessarily in order): initialize the system 200 variables and events, (step 301); calculate the initial lifetime of each system 200 section (step 302); calculate the system lifetime (step 303); as system 200 events occurs, calculate the lifetime used for each system 200 section (step 304); calculate additional lifetime for each system based in the current system 200 events (step 305); calculate a new lifetime for each system 200 section (step 306); and calculate a new system 200 lifetime. Thus, the system 200 section with the shortest predicted lifetime is the section that will cause the system 200 to fail (step 307).

Whenever a section of system 200 failure occurs in the simulation, the subsection of the section that caused the failure is reinitialized and the remaining lifetime for the other subsections is recalculated. After the new lifetimes have been calculated, the section with the shortest predicted lifetime will be the section that causes the next machine failure.

The number of cuts that can be made with a unit of each material (e.g. a roll-sheet material or a drum of liquid material) may be calculated. For example, this may be the number of cuts the main machine 202 can make before a splice is required to introduce a new roll of nonwoven liner material. The data parameters that indicate the number of cuts prior to a splice, drum change, etc. of each material used by system 200 is supplied to the simulation model via the external database 100.

When any of the materials used by a section approaches depletion, the simulation model calculates a new material quantity for that material. Though material splices or the like do not necessarily cause the system 200 or a section thereof to experience a system event such as a stop, such material changes potentially influence the run life of the system section to which the change was made. For example, each time a material roll splice occurs on the main machine 202, all forty three sub-sections have their lifetime recalculated by the model as a result of the splice. As a result, the next predicted system 200 failure or system event may be adjusted.

Figure 4:
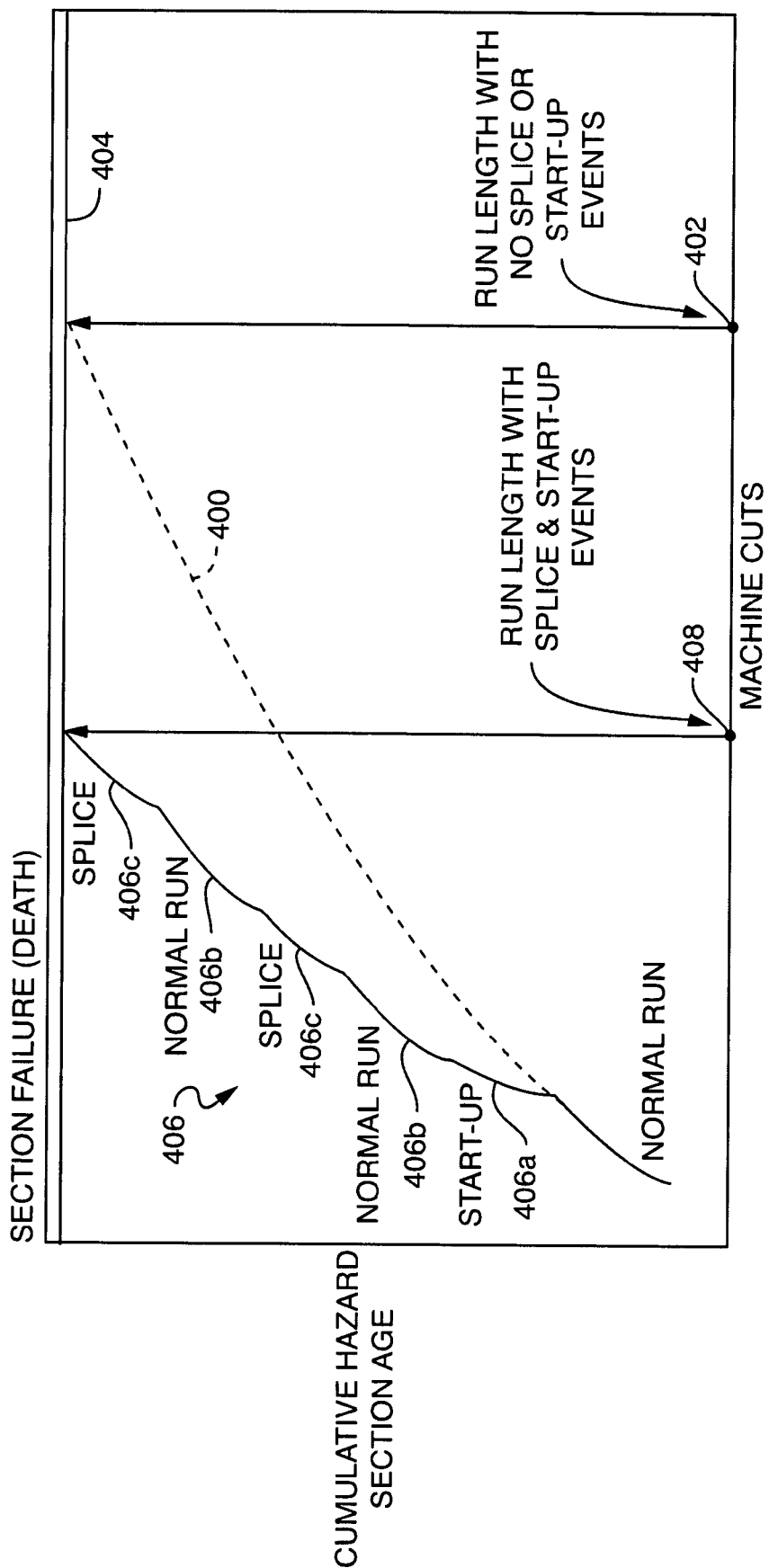
FIG. 4 is a graphical demonstration of the how multiple system events can affect the number of machine cuts on the exemplary system of FIG. 1.
Figure 5:
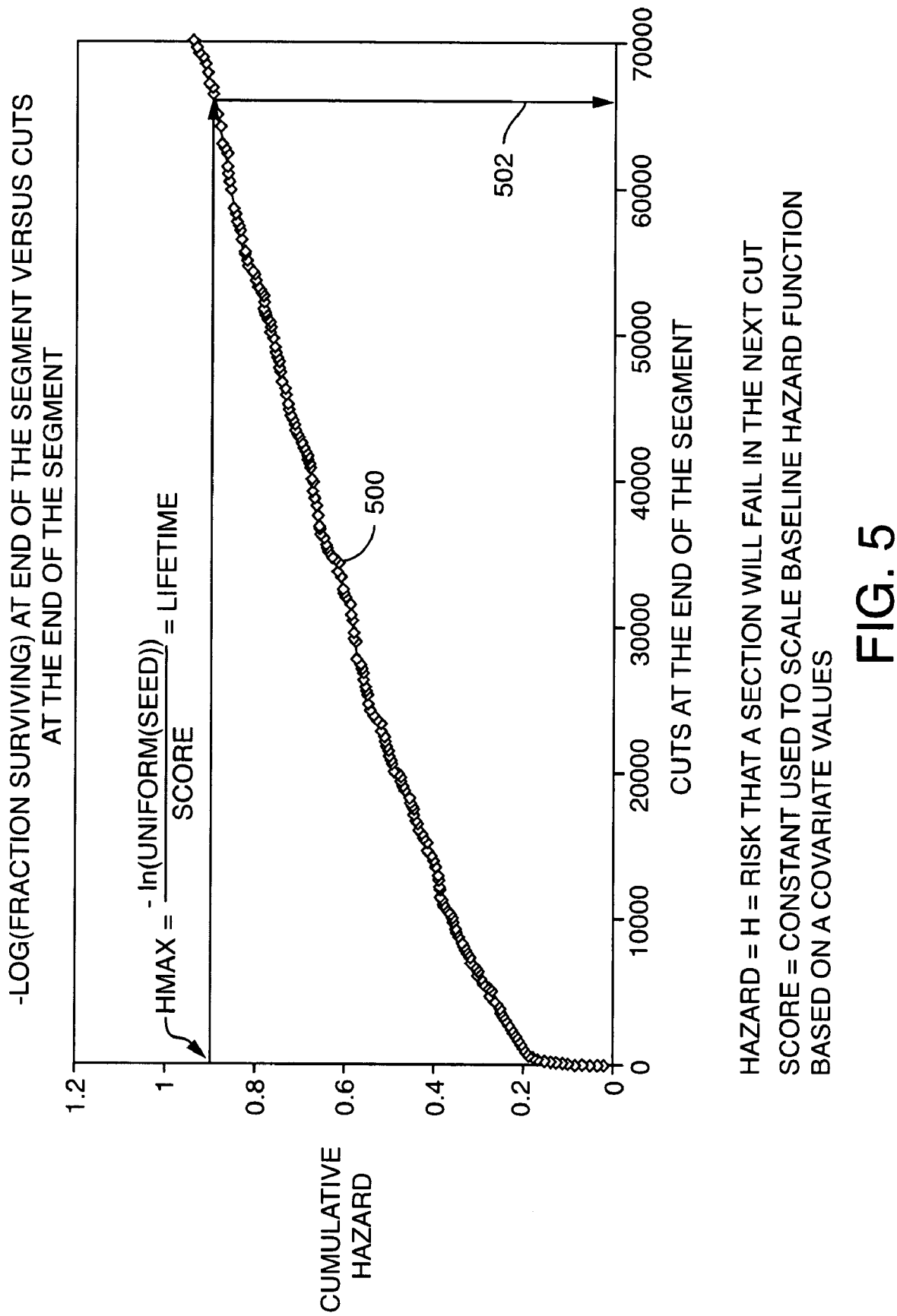
FIG. 5 is a graphical demonstration of the cuts at the end of a segment vs. the cumulative hazard the exemplary system of FIG. 1, used to determine the latent lifetime.

As demonstrated in FIG. 4, the method of predicting machine failures based on section lifetime calculations continues throughout the simulation run. For example, FIG. 4 shows a dashed curve representing a normal-run of system 200, referred to as run curve 400. There are no splice or start-up events shown on run curve 400. The number of cuts is shown as point 402, the time the cumulative hazard section age reaches failure level 404. By contrast, when a system 200 experiences splice or start-up events, the number of machine cuts is lessened. Line 406 represents the effect the splices and start-up events have on an otherwise normal run. For instance, it can be seen that a start-up 406a ages the system 200 more rapidly than a normal run 406b. Likewise, the splices 406c ages the system 200 more rapidly than normal run 406b. Thus, the number of machine cuts 408 made by a system 200 that experiences multiple events is less than the number of machine cuts 402 made by a system 200 that experiences no events such as splices and start-ups.

FIGS. 5-8 illustrate the steps to determine the hazard function for machine section 202. As demonstrated in FIG. 5, the number of cuts at which each machine section 202 will experience a failure is determined from the curve showing the number of cuts at the end of a segment versus the cumulative hazard. In this implementation, the hazard is chosen randomly and transformed to a cumulative hazard scale and the final cuts are found by interpolation. As shown, the number of cuts 502 where the main machine 202 experiences failure is about 66,000. This initial lifetime is a latent quality and remains constant over the total lifetime of the machine section 202.

Figure 6:
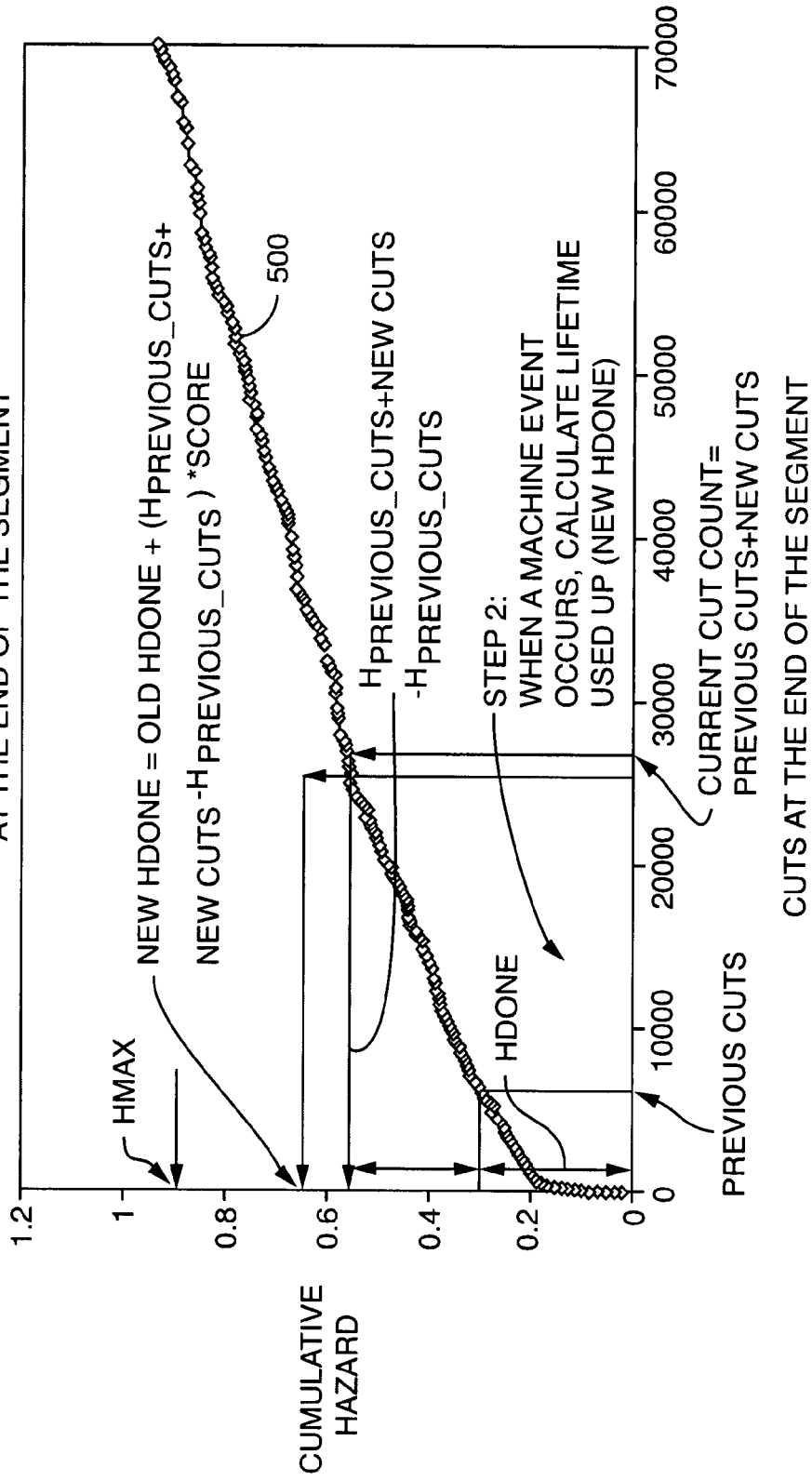
FIG. 6 is a graphical demonstration as seen in FIG. 5, used to determine the lifetime used when a system event occurs.

Referring now to FIG. 6, the same curve 500 is used to calculate the lifetime or hazard that has been used up prior to the event. The current cumulative hazard (HDONE) is calculated from the prior value of HDONE plus the incremental hazard since the last system event, adjusted by a score that quantifies the difference between the operating conditions over that interval and the baseline value determined by the M matrix. Thus, whenever an event that could change the current hazard occurs, then the remaining lifetime is recalculated reflecting the current risk.

Figure 7:
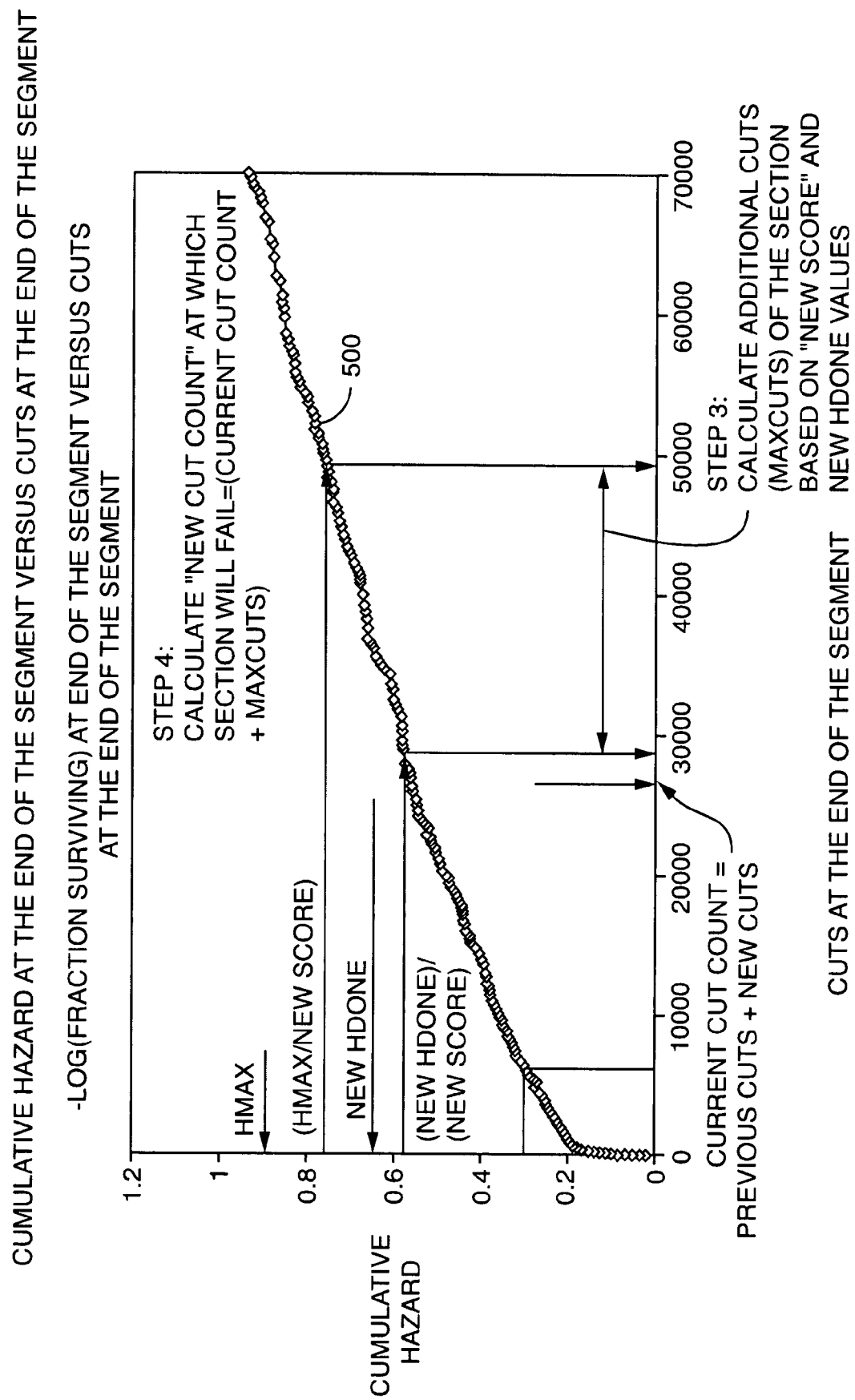
FIGS. 7 and 8 are graphical demonstrations as seen in FIG. 5, used to determine the new cut count at which the system will fail.

Referring now to FIG. 7, the following step involves calculating the remaining lifetime or cuts of which the machine section 202 is capable of based on the percent of lifetime that has been used (calculated form FIG. 6) and the original lifetime scaled to account for system 200 events and conditions. A new proportional hazard score is calculated, reflecting the difference between the new operating conditions and the conditions specified in the M matrix. The new proportional hazard score is used to rescale both the current cumulative hazard HDONE and the lifetime for the section, HMAX. The values are used to interpolate the cuts variables and the maxcuts variable.

Figure 8:
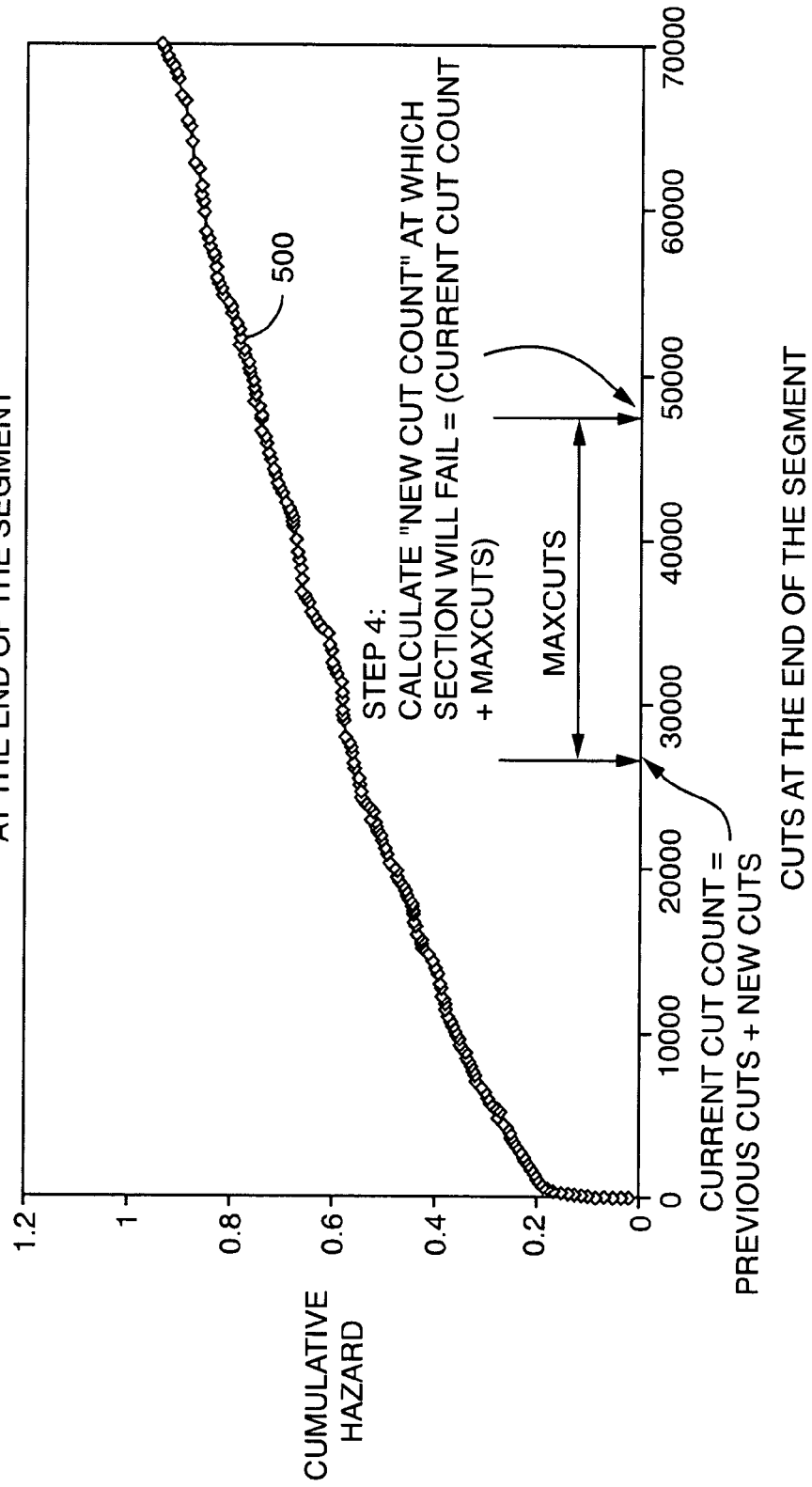

Referring now to FIG. 8, the final step is to predict the number of cuts at which a particular machine section will fail. As mentioned above, the uptime of system 200 is equal to the uptime of the individual machine section with shortest lifetime. Once the remaining lifetime has been recalculated, it can be added to the current cut count to set the point of its failure.

The exemplary system 200 described herein may be implemented on a computer that runs many times faster than the system 200, and may be used to forecast future system performance. This presents an advantage in that it is possible to simulate many possible future outcomes and continually update a forecast of future performance. For instance, the forecasts may include quantities such as the predicted uptime until the next failure; the probability of failure in a certain period of time, e.g. the next hour; and other quantities of interest to system operators and plant engineers. The simulation model may further include estimates of the probability of failure for each of machine section or subsections, perhaps displaying estimates graphically with the machine sections 202 ordered by failure risk. If the system is augmented with further information such as causal information and/or a history of interventions and outcomes, it may be used to generate diagnoses and suggest repairs or changes to avert future problems.

The final step in the method of the present invention is to run experiments evaluating the effect of changes in the reliability of system components, changes in machine events or conditions, or changes in machine design. For example, one may determine the impact of improving a system section or improving splice reliability. As indicated, simulation modeling is used to predict the impact of improving the reliability of one or more system 200 sections to reduce the occurrence of failures such as machine stops. "Improvement" of a section or sub-section means that in the simulation, it will be activated or inactivated, see Table 5 below. Specifically, in the "Active/Inactive" column of Table 5, there is listed either a "0" or "1" which corresponds to each machine 202 sub-section. A "0" means that the corresponding sub-section is active in the simulation. A "1" means that the corresponding sub-section is inactive in the simulation, which means that while it still is part of the system 200, it does not experience any system event. System events may also be inactivated, for example, splices. In effect, an inactive sub-section or system event operates perfectly. Of course, any number or character may be used to indicate that a sub-section or system event is active or inactive in the simulation.

An additional way to demonstrate the impact of improving a section or subsections reliability on total machine stops or uptime is to increase the lifetime of a section such that the average lifetime of the section or sub-section is greater than its original lifetime. When the average lifetime is increased in this way, the section or subsection does not need to be inactivated, or in other words, made perfect.

TABLE 5

Capability to Turn a Machine Section to Active/Inactive Status

| Machine Section Name | Active/Inactive |
| --- | --- |
| Wrapsheet | 1 |
| Waist Elastic | 1 |
| Tucker | 1 |
| Surge | 1 |
| Stretch wrapper | 0 |
| Stacker | 1 |
| Stack Handling | 0 |
| Side Panel Application | 1 |
| SAM | 1 |
| Liner | 1 |
| Leg Elastics | 1 |
| Leg Die Cutter | 1 |
| KDF Loader | 0 |
| Hook Bonder | 1 |
| Hook Application | 1 |
| Fluff Forming | 1 |

Optionally, one may test the simulation model against actual data obtained from the system that has been simulated. While this step is not critical to the simulation method of the present invention, it does serve to show the accuracy of the simulation model. For example, the machine section 202 sub-sections experiencing the top ten stops are shown below in Table 6. It can be seen that for several sub-sections, the confidence intervals overlap. For these sub-sections (e.g. fastening and electrical), the simulation model more accurately predicts the actual machine 202 performance than for the sub-sections not having an overlapping confidence interval. At this point, it may or may not be desirable to revise the simulation model, depending on the criteria such as risks associated with the simulation, costs etc.

TABLE 6

TOP 10 STOPS BY SECTION
N = 100 Days of Operation

| Section Name | Simulation Mean Count | Simulation Confidence Interval (95%) | Actual Mean Count | Actual Confidence Interval (95%) | Confidence Intervals do not Overlap |
| --- | --- | --- | --- | --- | --- |
| Flap Elastic Composite | 9.2 | 1.0 | 10.7 | 1.3 | No |
| Operator Stop | 8.3 | 0.7 | 10.0 | 1.1 | No |
| Fastening | 4.6 | 0.8 | 7.7 | .0.8 | Yes |
| Stacker | 6.3 | 0.6 | 7.7 | 1.0 | No |
| Hook | 10.2 | 6.5 | 7.7 | 0.9 | No |

TABLE 6-continued

TOP 10 STOPS BY SECTION
N = 100 Days of Operation

| Section Name | Simulation Mean Count | Simulation Confidence Interval (95%) | Actual Mean Count | Actual Confidence Interval (95%) | Confidence Intervals do not Overlap |
|---|---|---|---|---|---|
| SURGE | 8.7 | 0.8 | 7.0 | 1.0 | No |
| Leg Die Cut | 6.6 | 0.7 | 6.6 | 0.7 | No |
| SPA | 10.9 | 2.1 | 6.1 | 0.8 | Yes |
| Waist Elastic | 9.4 | 1.4 | 6.0 | 0.8 | Yes |
| Electrical | 4.2 | 0.6 | 5.9 | 0.8 | Yes |

Next, regardless of whether the simulation model has been compared to an actual system, the simulation model can be run at least once to generate results that can be used to determine whether or not it is feasible to upgrade or otherwise improve a machine 202 sub-section. It is most desirable to run the simulation model more than one time, inactivating one or more sub-sections during a run to see the effect of "perfecting" certain sub-sections has on the section 202 and/or system 200 as a whole.

For example, Table 7 is a compilation of results for select sub-sections of machine 202, whereby each sub-section has been inactivated separately for at least five different simulation runs. Listed in Table 7 for each machine 202 sub-section is (a) the number of stops per day that each sub-section experiences, (b) the number of stops per day that the overall machine 202 experiences, and (c) whether or not the stops are statistically different for the machine 202 baseline. For instance, the hook applicator sub-section experiences 10.2 stops per day. The main machine 202 as whole experiences 147 stops per day, with a 95% confidence interval of 6.5. By improving the performance of the hook applicator sub-section, the main machine 202 stops per day is estimated to be 152 stops, with a 95% confidence interval of 6.2. Therefore, improving the performance of the hook applicator will not result in a statistical difference in the number of stops per day for the baseline system. It can further be seen from Table 7 that there is no statistical difference in the number of stops per day for the baseline system by improving the waist elastic sub-section and the flap elastic composite sub-section. Improvement can, however, be achieved by repairing, replacing or upgrading the side panel applicator sub-section; this action results in a reduction in stops per day by at least about 5 stops. What is surprising about the results below is that it is not worthwhile to expend efforts to improve all four of the sections in Table 7. It is further noted that, while it may seem logical to improve a sub-section that experiences the most stops per day, it may not always result in the an improvement of the entire system or larger section.

TABLE 7

| Main Machine 202 Sub-section | Sub-section Stops per Day | Main machine 202 Stops per Day | Statistical difference from baseline? |
|---|---|---|---|
| Main Machine 202 Baseline | | 147 + or − 6.5 | |
| Side Panel Applicator | 10.9 (1$^{st}$) | 132 + or − 3.6 | Yes |
| Hook Applicator | 10.2 (2$^{nd}$) | 152 + or − 6.2 | No |
| Waist Elastic | 9.4 (3$^{rd}$) | 139 + or − 5.6 | No |
| Flap Elastic Composite | 9.2 (4$^{th}$) | 149 + or − 9.5 | No |

With respect to system 200, simulation modeling may further be used to predict the impact of improving the efficiency of splices and start-up on total machine stops per day. This particular example will demonstrate the effect of improving select splices and the start-up efficiency for main machine 202. Listed in Table 8 is a sample of the various roll-form materials that are used to construct the articles of system 200.

As with the previous example, each material can be inactivated so that it does not experience a system event during a simulation run. A system event would likely be either a failed splice or breakage of the material anytime after a splice has occurred. Data showing the minimum, maximum, and average number of yield (cuts) from each material is also listed. Materials that have a lower number of cuts per roll will need to be spliced more frequently, and therefore, may experience more system events than other materials.

Table 8 shows the effect of perfecting certain splices and the start-up efficiency. One may conclude that it may not be cost effective to upgrade or improve any of the splices. What makes the most difference is improving the start-up efficiency. By improving the start-up efficiency, the number of stops per day is reduced from about 147 stops to about 115 stops.

TABLE 8

| Condition | Stops Per Day | Different Than Baseline? (Yes/No) |
|---|---|---|
| Baseline | 147 ± 6.5 | |
| Side Panel Splice | 140 ± 7 | No |
| OC Splice | 148 ± 4.7 | No |
| All Splices | 124 ± 3.7 | Yes |
| Start-Up | 115 ± 2.5 | Yes |

It is noted that while the above simulation examples examine an improvement in number of stops, it may be preferable to examine improvement in uptime or some other variable. For instance, in the bagging section, it may be desirable to see what effect an increase in buffer size has on the uptime (runtime) of the packaging section.

Figure 9:
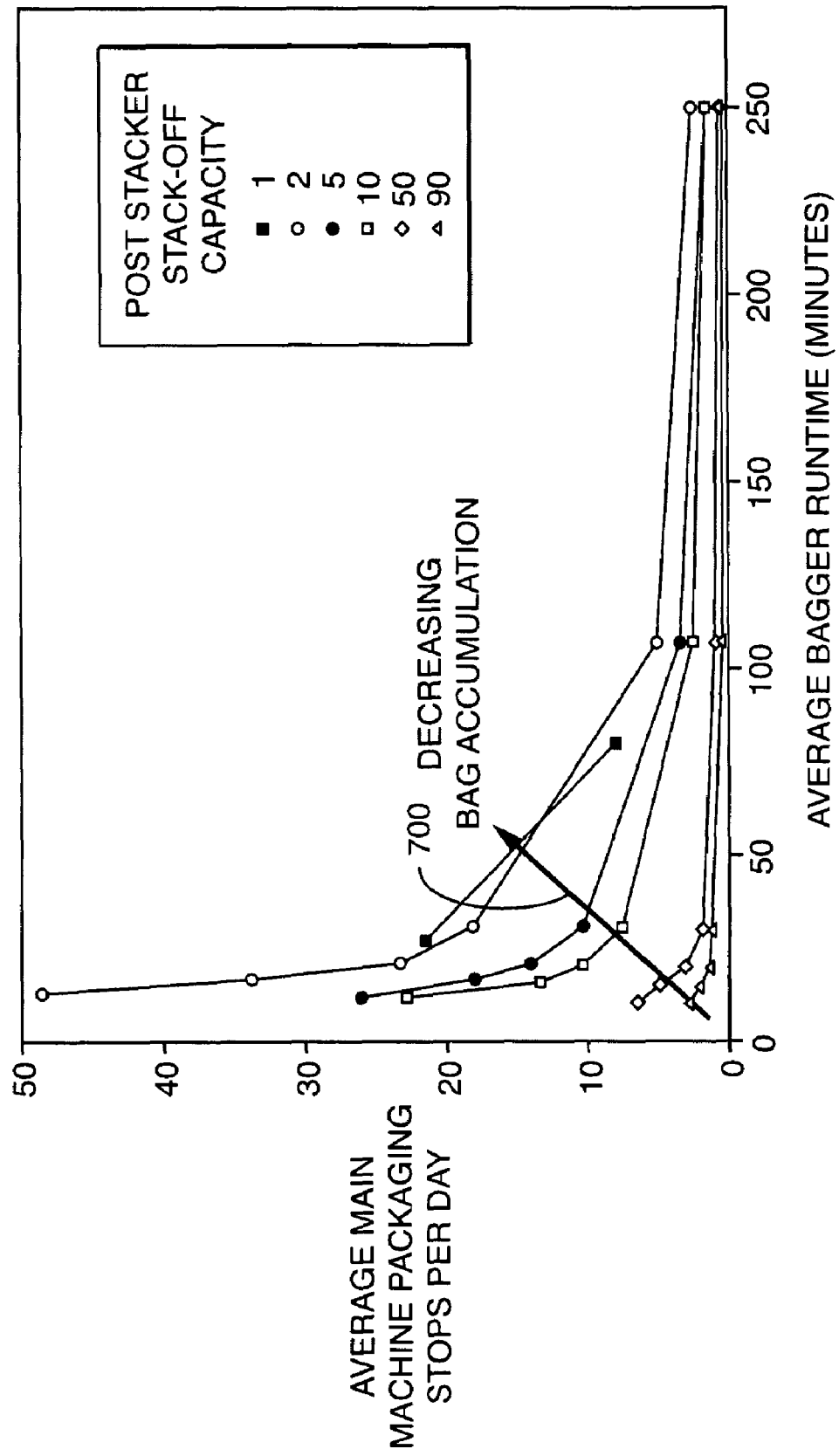
FIG. 9 is a graphical demonstration of average bagger runtime vs. packaging stops per day for the exemplary system of FIG. 1.
Figure 10:
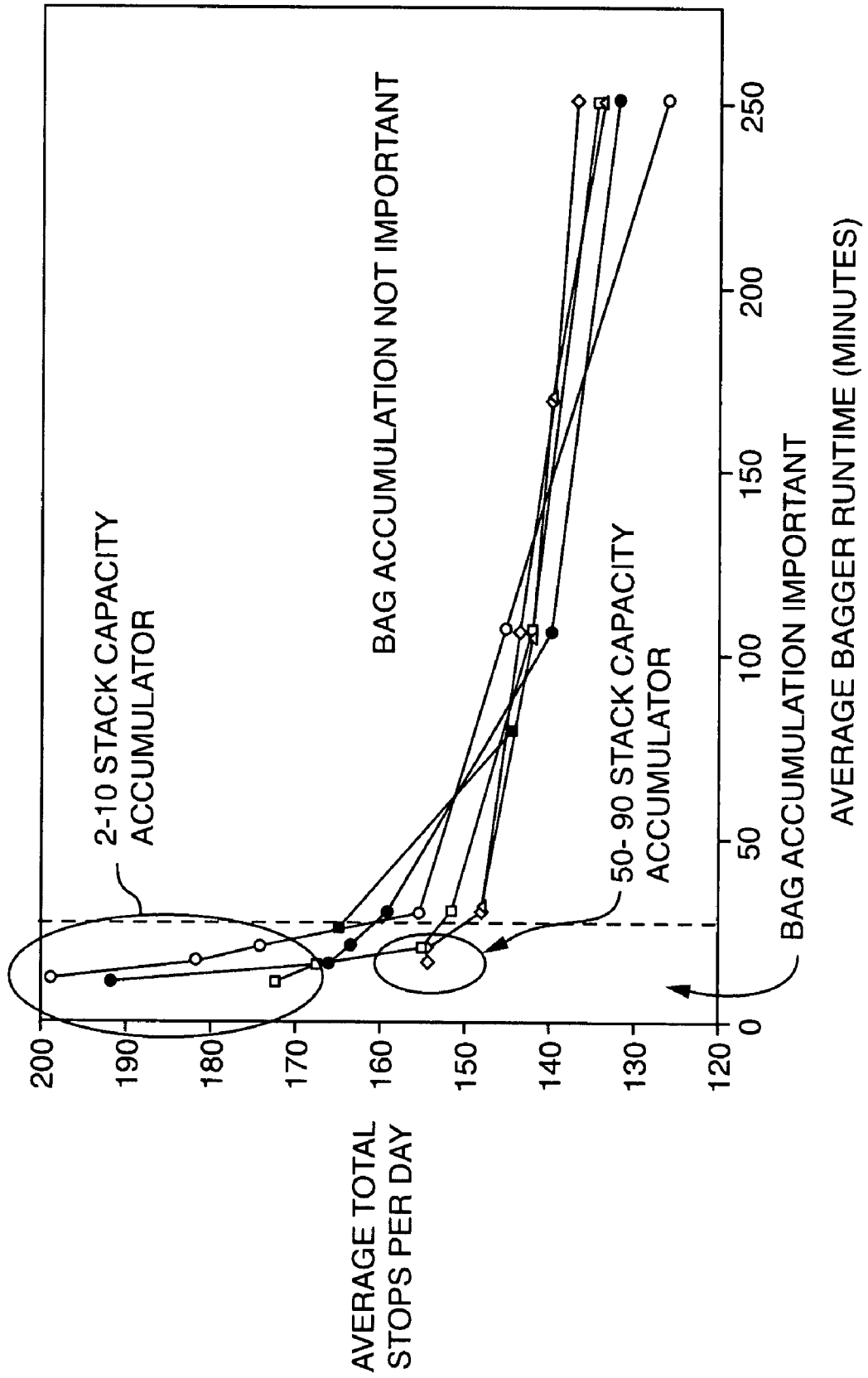
FIG. 10 is a graphical demonstration of average bagger runtime vs. total machine stops per day for the exemplary system of FIG. 1.

The simulation model was further used to estimate the impact on total stops per day of future packaging changes which would eliminate stack accumulation. FIGS. 9 and 10 show the impact of future changes to the packaging equipment. The results from this analysis allows the user to compare the impact of stack accumulation capacity versus bagger reliability and total machine reliability.

In particular, FIG. 9 shows the number of packaging section stops per day versus the average run-time of the bagger and stack capacity of the buffer between the main machine and bagger. Knowing the reliability of the bagger, defined as the average run-time between bagger stops, the buffer capacity needed to achieve specific packaging section reliability or packaging stops per day can be determined. For example, packaging stops per day increases as bag accumulation decreases as indicated by the trend line 700 and average bagger runtime decreases.

FIG. 10 is a similar graph showing the number of total machine stops-per-day versus the average run-time of the bagger and stack capacity of the buffer between the bagger and main machine. Knowing the reliability of the bagger, defined as the average run-time between bagger stops, the buffer capacity needed to achieve specific machine reliability or machine stops per day can be determined. For example, when the average bagger run-time is less than 25 minutes, bag accumulation becomes important. Conversely, when bagger run-time is greater than 25 minutes, the impact of bag accumulation becomes progressively less important.

The foregoing description of the embodiments of the invention have been presented for purposes of illustration and description. It is not intended to be exhaustive or to limit the invention to the precise form disclosed. Modifications or variations are possible and contemplated in light of the above teachings by those skilled in the art, and the embodiments discussed were chosen and described in order to best illustrate the principles of the invention and its practical application. It is intended that the scope of the invention be defined by the claims appended hereto.

What is claimed is:

1. A method for simulating a system comprised of sections and having multiple failure modes, the method comprising the following steps:
    a) in a computer, obtaining system event data for each of the sections, the system event data comprising the timing of system events, and creating predetermined covariates based on the system event data;
    b) statistically modeling a lifetime of each of the sections as a function of system event data;
    c) simulating the system based on a dynamic simulation model, and recalculating the lifetime of at least one of the sections between at least one type of system event; and
    d) implementing changes to the dynamic simulation model during the step of simulating the system.

2. The method of claim 1 further comprising a step of estimating system event data.

3. The method of claim 1 wherein the steps are accomplished in the following order: a, b, c, and d.

4. The method of claim 3 wherein the system is selected from a group consisting of a continuous manufacturing system and a non-continuous manufacturing system.

5. The method of claim 3 further comprising the step of e) prioritizing an improvement plan for the system.

6. The method of claim 5 wherein the step of prioritizing an improvement plan is performed in real time.

7. The method of claim 1 further comprising the step of prioritizing an improvement plan for the system in an effort to minimize system events.

8. A method for simulating a discrete product manufacturing system comprising sections and having multiple failure modes the method comprising the following steps:
    a) in a computer, defining the system;
    b) identifying system sections that can cause system events;
    c) identifying system events that can affect the reliability of the system;
    d) statistically modeling a lifetime of the system;
    e) building a simulation model which takes into account interactions between sections as system events occur during a simulation run;
    f) conducting a simulation run; and
    g) calculating the lifetime of the system between at least one the of system event; and
    h) implementing system improvement projects as a result of evaluating the effect of system changes or system event changes on the lifetime of the system.

9. The method of claim 8 further comprising the step of forecasting a future system performance by conducting multiple simulation runs.

10. The method of claim 9 wherein the step of forecasting a future system performance is performed in real time.

11. The method of claim 8 further comprising the step of evaluating the effect of system section or sub-section changes on the lifetime of the system.

12. The method of claim 8 wherein the step of building a simulation model which takes into account interactions between sections as system events occur during a simulation run further comprises:
    initializing system variables and events;
    calculating an initial lifetime of each system section;
    calculating a system lifetime;
    calculating a lifetime used up for each system section;
    calculating an additional lifetime for each system section based on current system events;
    calculating a new lifetime for each system section; and
    calculating a new system lifetime.

13. A method for simulating a system having multiple failure modes comprised of sections and sub-sections, the method comprising the following steps:
    a) in a computer, defining the system;
    b) identifying system sections that can cause system events;
    c) identifying system events that can affect the reliability of the system;
    d) statistically modeling a lifetime of the system;
    e) building a dynamic simulation model which takes into account interactions between sections as system events occur during a simulation run;
    f) conducting multiple simulation runs by either changing the reliability of at least one system section, or by changing the impact of a system event on at least one machine section during each simulation run; and
    g) implementing system improvement projects as a result of evaluating the effect of system section changes or system event changes.

14. The method of claim 13 further comprising the steps of:
    calculating an initial lifetime of each system section; and
    calculating a system lifetime.

15. The method of claim 14 further comprising the steps of:
    calculating a lifetime used up for each system section; and
    calculating an additional lifetime for each system section based on current system events.

16. The method of claim 15 further comprising the steps of:
    calculating a new lifetime for each section; and
    calculating a new system lifetime.

17. The method of claim 16 wherein the system comprises a manufacturing system.

18. The method of claim 17 wherein the manufacturing system is adapted to produce disposable absorbent products.

* * * * *